No. 862,631. PATENTED AUG. 6, 1907.
W. F. M. GOSS.
DISTILLING APPARATUS.
APPLICATION FILED OCT. 18, 1902.
4 SHEETS—SHEET 2.
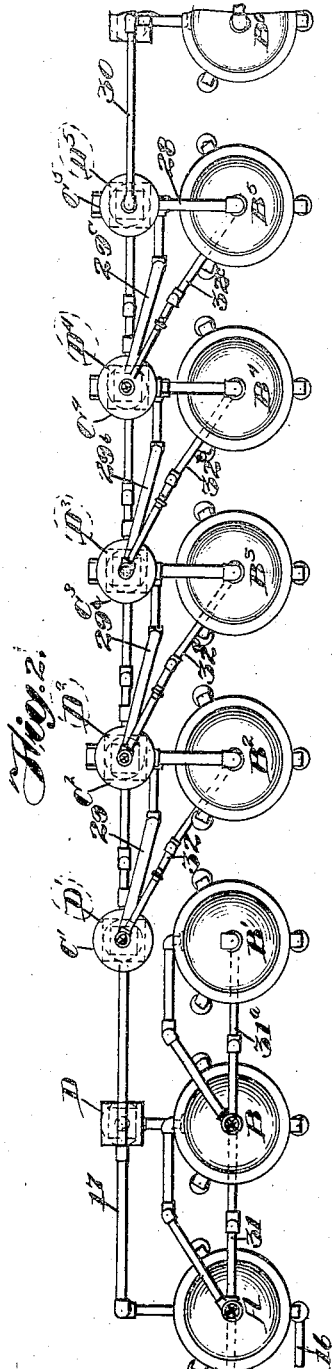
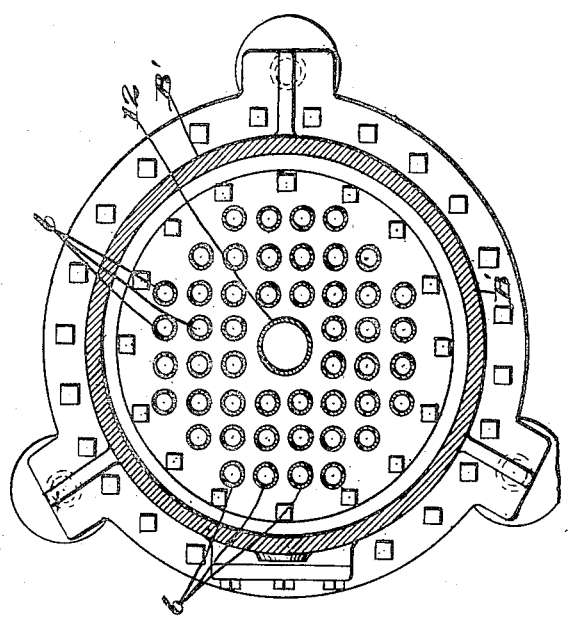
Witnesses:
J. B. Weir
Om. Mimiel
Inventor:
William F. M. Goss.
by A. Miller Belfield
Atty

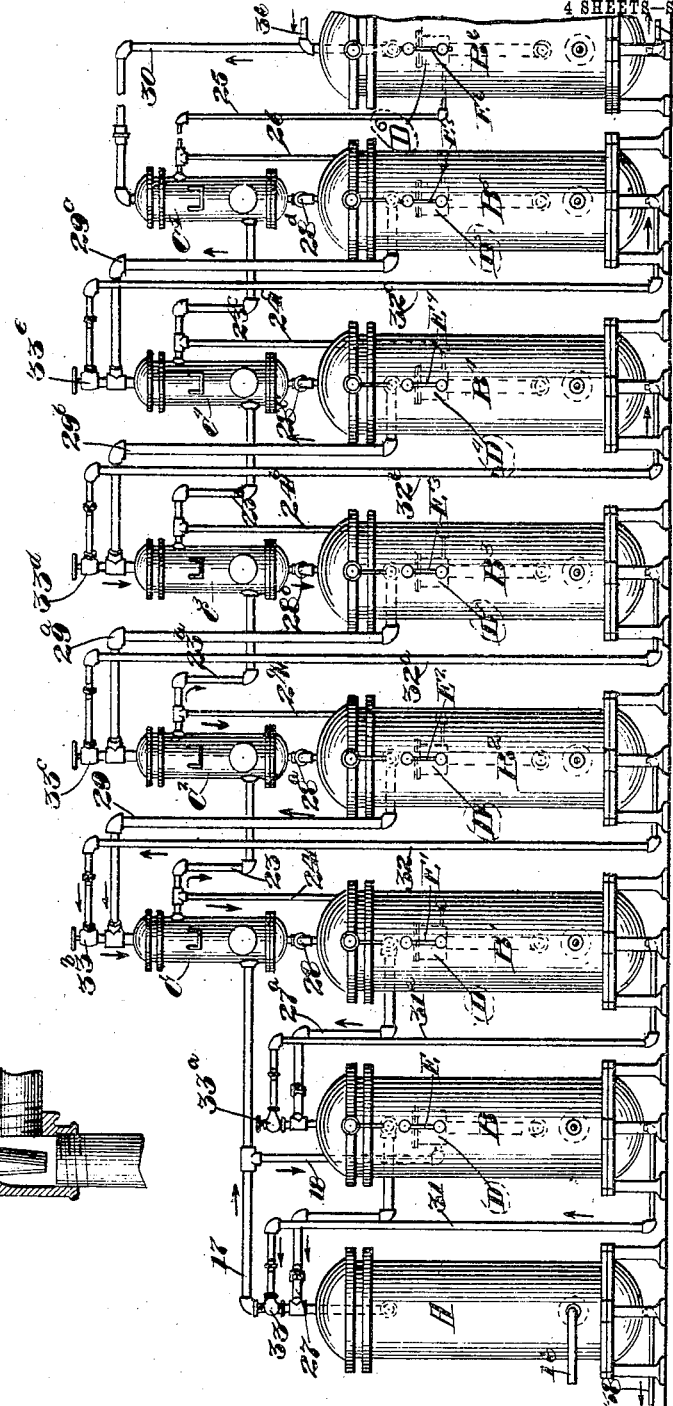
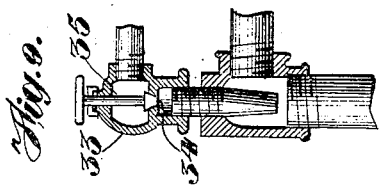

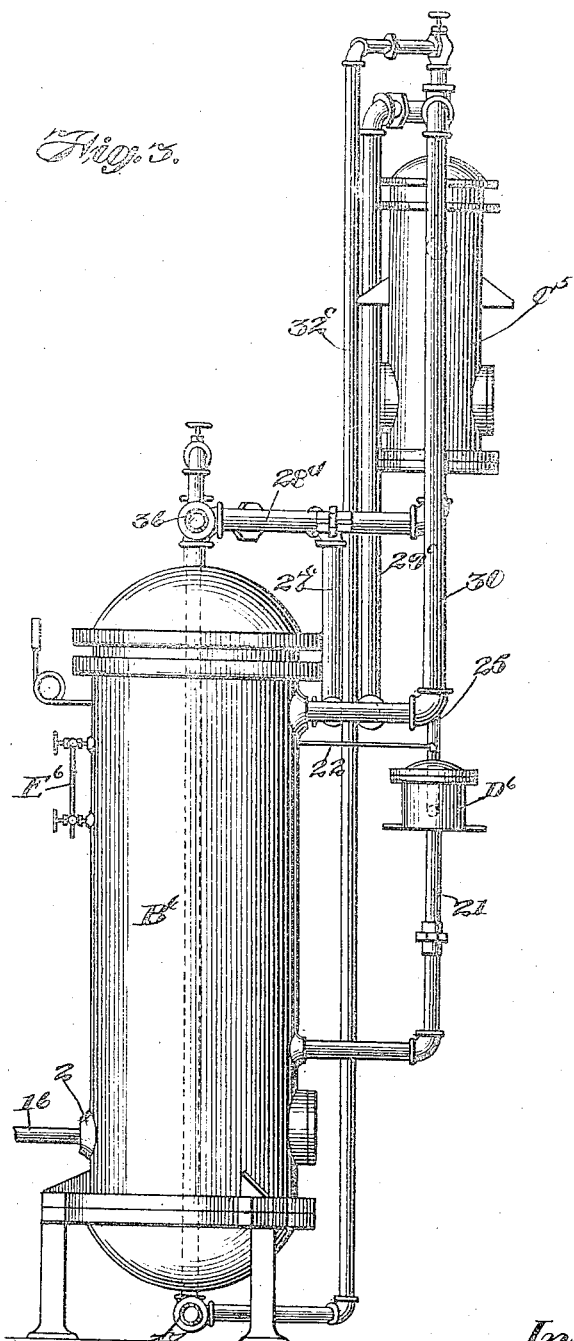

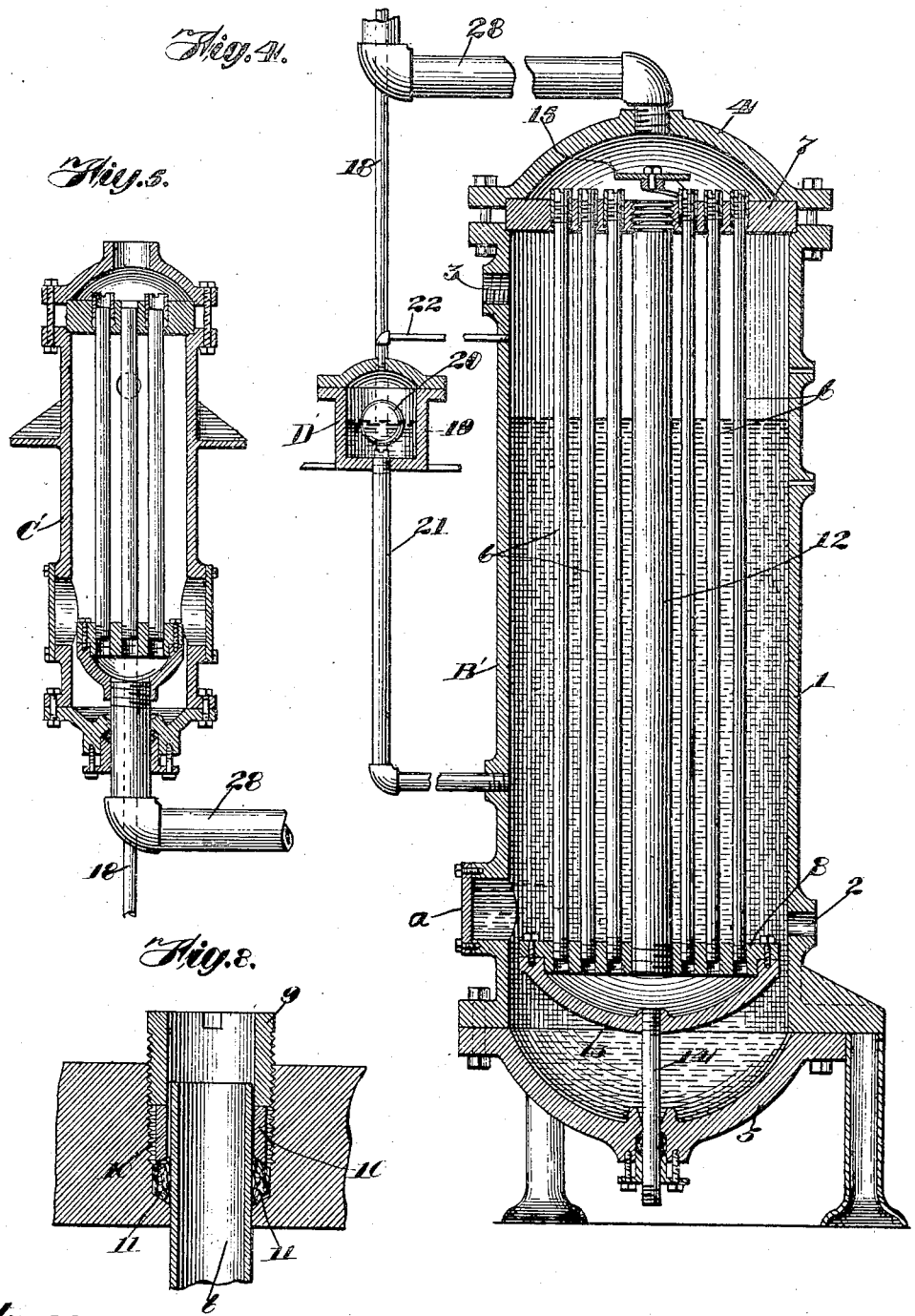

UNITED STATES PATENT OFFICE.

WILLIAM F. M. GOSS, OF LA FAYETTE, INDIANA, ASSIGNOR TO UNITED STATES DISTILLATION COMPANY, OF INDIANAPOLIS, INDIANA, A CORPORATION OF INDIANA.

DISTILLING APPARATUS.

No. 862,631.      Specification of Letters Patent.      Patented Aug. 6, 1907.

Application filed October 18, 1902. Serial No. 127,835.

*To all whom it may concern:*

Be it known that I, WILLIAM F. M. GOSS, a citizen of the United States, residing at La Fayette, in the county of Tippecanoe and State of Indiana, have invented a certain new and useful Improvement in Distilling Apparatus, (Case 4,) of which the following is a full, clear, concise, and exact description, reference being had to the accompanying drawings, forming a part of this specification.

My invention relates in general to apparatus for distilling liquids by evaporation and condensation, and also for the separation of solids in solution by evaporation, and it relates in particular to apparatus involving a set or series of evaporating chambers in which the evaporation takes place.

The principal object of the invention is to provide an effective and advantageous feed system for supplying the evaporators with properly heated liquid to replace that constantly being evaporated.

In the apparatus herein shown for carrying out my invention, I provide independent or separate heating chambers or heaters for heating the liquid before it enters the evaporating chambers,—preferably one heater for each evaporator. These heaters are supplied with the liquid to be distilled and the liquid in each is properly heated and then automatically fed to the chamber it is supplying, in this heated condition. The liquid is supplied to the heaters at such pressure as to insure its entering any of the evaporators.

In the accompanying drawings, I have shown my present feed system applied to an apparatus set forth and claimed in Patent No. 713,297, issued November 11, 1902. In such apparatus the liquid to be distilled is fed forwardly to the different evaporators, and the vapors resulting from each are carried back and caused to heat and evaporate the contents of the next preceding evaporator, and the condensate resulting is carried still further back and caused to heat and evaporate the contents of the second preceding evaporator. In using my present feed system in connection with such apparatus, I employ the backwardly moving vapors and condensate to heat the liquid in the several heaters. In this arrangement there are combined with the set or series of evaporators a main heater of large size to preliminarily heat the feed liquid, and also a set or series of smaller auxiliary or supplemental heaters. The latter are arranged one for each of the evaporators between the end evaporators. That is to say, the first evaporator is supplied by the main heater and all of the others, excepting the last, are supplied by the auxiliary heaters and the last evaporator is supplied by the last heater which also supplies the preceding evaporator. All of the heaters are supplied with liquid to be distilled by a suitable source of supply as a pump at a pressure at least as great as the highest pressure in the evaporators.

In the accompanying drawing, Figure 1 is a side elevation of a distilling apparatus embodying my present invention. Fig. 2 is a plan of the same. Fig. 3 is an end elevation of the same on an enlarged scale. Figs. 4 and 5 are vertical sections of one of the evaporators and one of the heaters respectively. Figs. 6 and 7 are transverse sections of the same. Figs. 8 and 9 are vertical sections of details of construction.

The apparatus shown in the drawings for carrying out my invention, comprises a heating chamber or heater A and a plurality of evaporating chambers or evaporators B, B', B$^2$, B$^3$, B$^4$, B$^5$, and B$^6$. The heater A is for preliminarily heating the water to be distilled, and the evaporators B, B', etc. are for evaporating it. These chambers or receptacles can be of any suitable construction, but are preferably made as shown in Figs. 4 and 6. This construction consists of a cylindric casing 1 having pipe openings 2 and 3 and provided with a top 4 and a bottom 5. Within the casing is a set of pipes 6, 6, 6 extending between an upper head 7 and a lower head 8. The pipes 6, 6 have a threaded connection with the lower head 8, and have loose joints adapted to allow expansion and contraction, with the upper head 7. The joints shown consist each of a threaded sleeve 9 and a packing sleeve 10 into which the pipe 6 fits, and packing 11 below the sleeve 10. The head 7 is fitted between the top 4 and casing 1, and the lower head 8 is suspended by a large pipe 12, the head 6 being smaller in diameter than the interior of the casing 1. A bowl 13 is secured to and below the head 8 and a pipe 14 extends downwardly from the latter and out through a stuffing box in the bottom 5. A baffle plate 15 is supported above the pipe 12. The character of the several details entering into the construction of each individual evaporator chamber has been determined with reference to ease in cleaning the chambers. To this end, the outer shell is provided either with a man-hole or hand-hole $a$ (Fig. 4), depending upon the size of the apparatus, and a blow-off pipe, not shown in the drawings, connects with the lower portion of the chamber. To serve in more thorough cleanings than may be permitted by these means, the construction is such that by disconnecting the piping, and by the removal of the upper covers of the evaporator chamber, the whole nest of tubes with their attached heads, can be drawn upward and thence out of the shell of the chamber. All parts having been thoroughly cleaned, they may be as easily restored to place.

Arranged above and associated with the evaporators B', B$^2$, B$^3$, B$^4$ and B$^5$, are small or auxiliary heaters C', C$^2$, C$^3$, C$^4$, and C$^5$, by which the liquid under distillation is heated before it enters the corresponding evaporator. The heaters C′, C², etc. can be of any suitable construction, but are preferably made as shown in Figs. 5 and 7. This construction is similar to that of the evaporators and hence need not be described. The general construction of the evaporators, so far as the nesting of the tubes is concerned, is carried out in the design of the several heaters.

An inlet pipe 16, conveying the liquid to be distilled, is connected with the opening 2 of the large heater A. Connected with the other opening 3 of this heater A, is a feed pipe 17, which extends to and is connected with the lower end of the auxiliary heater C′. A branch feed pipe 18 for the first evaporator, extends from the feed pipe 17 down to a feed regulator D (Fig. 1). This regulator is adapted to regulate the supply of liquid fed to the evaporator B and to maintain the height of the same constant. To such end it consists of a casing 19 containing a float 20, controlling a feed valve which closes as the float rises. Valves performing this function are to be had on the market, and originality is not claimed for the details of this feature of the apparatus.

The regulator D is connected with the evaporator B by a feed pipe 21 and a pressure equalizing pipe 22, connecting the regulator chamber and the steam space of the evaporator chamber. A feed pipe 23 connects the upper portion of the heater C′ with the lower part of the next heater C², and similar pipes 23ª, 23ᵇ, connect the remaining heaters together in a similar manner. Branch feed pipes 24, 24ª, connect the pipes 23, 23ª, with regulators D′, D², D³, and D⁴, constructed and connected as explained in regard to the regulator D. From the end heater C⁵, a feed pipe 25 runs directly to a regulator D⁶ on the evaporator B⁶ and a branch feed pipe 26 runs to a regulator D⁵ on the evaporator B⁵, both regulators being constructed and connected similarly to the others.

A vapor pipe 27 is connected with the top of the heater A and extends therefrom to the evaporator B to whose upper portion (at the opening 3, Fig. 4) it is connected. In a similar manner, another vapor pipe 27ª extends from the top of the evaporator B to the upper part of the next evaporator B′. A mixture pipe 28 extends from the top of the evaporator B′ to the bottom of the heater C′ (Figs. 4 and 5), and a vapor pipe 29 extends from the top of the heater C′ to the upper part of the evaporator B². Similar pipes 28ª, 28ᵇ, 28ᶜ, and 28ᵈ, and 29ª, 29ᵇ and 29ᶜ are provided. From the top of the last heater C⁵ a vapor pipe 30 extends to and is connected with the side of the last evaporator B⁶ near the top thereof. A mixture pipe 31 is connected with the vapor pipe 27 near the connection of the latter with the heater A, and extends to the bottom of the evaporator B. A similar pipe 31ª extends from the top of the evaporator B, to the bottom of the evaporator B′. In like manner a pipe 32 is connected with the vapor pipe 29 near the top of the heater C′ and is connected with the bottom of the evaporator B². Similar pipes 32ª, 32ᵇ and 32ᶜ are provided. At the junction of the pipes 27 and 31 is located a pressure reducing valve 33 which can be of any suitable construction, but conveniently consists of a contracted orifice 34 controlled by a valve 35 (Fig. 9). Similar pressure reducing valves 33ª, 33ᵇ, etc. are provided.

The last evaporator B⁶ is provided with a steam supply pipe 36 by which steam is conveyed to it from a boiler, and also with a return steam pipe by which the spent steam is returned to the boiler. The heater A is provided with an outlet pipe 38 for the distilled liquid. Other pipes not shown in the drawings, but elsewhere referred to in the description, connect, one each with the lower portion of each evaporator chamber B, B′, B², B³, B⁴, B⁵ and B⁶ respectively for the purpose of serving as a blow-off and drain. The evaporators B, B′, etc. are provided with glasses E, E′, E² etc. respectively.

The operation of the apparatus is as follows. The liquid to be distilled, such as raw water, is pumped to the heater A through the pipe 16. This liquid fills the casing of the heater A,—not entering the pipes 6, 6 or 12,—and then circulates around the same and out through the pipe 17, from which it flows into the evaporator B, the water level of which is maintained constant at the middle of the glass E, and thence into the heater C′, the shell of which it completely fills. From the heater C′ it overflows in the pipe 23 to the evaporator B′, and then the next heater C². In this way all the evaporators are supplied with water to be evaporated, the level in each shell remaining constant at a point near the middle of the glasses E, E′, E², E³, etc. respectively, while the heaters constitute in effect a part of the feed pipe system and are thus kept filled. Live steam at high pressure and temperature is then supplied the pipe 36 of the last evaporator B⁶, so that it circulates through the pipes thereof from top to bottom, passing out the pipe 37 and not commingling with the liquid to be distilled in the casing or evaporating chamber of this evaporator. This circulation of live steam causes evaporation of the liquid in the evaporator B⁶. The resulting vapors pass out the pipe 30 and into the top of the heater C⁵ whence they circulate downwardly in the pipes thereof, thereby heating the liquid in the heater and becoming condensed or partially condensed in so doing. The resulting condensate or mixture flows out of the heater C⁵ by way of the pipe 28ᵈ and into the top of the evaporator B⁵ where it circulates down through the pipes therein, heating the liquid in said evaporator in its passage. The condensate or mixture continues on out of the evaporator B⁵ by way of the pipe 32ᶜ, through the pressure reducing valve 33ᵉ and into the heater C⁴. The heating of the liquid in the evaporator B⁵ by the condensate or mixture circulating through it from the heater C⁵, causes evaporation of such liquid. The resulting vapors pass out through the pipe 29ᶜ and mingle with the mixture or condensate issuing from the pressure reducing valve 33ᵉ, the pressure of such mixture or condensate being reduced by such valve to substantially the pressure of the vapors coming from the evaporator B⁵, and the whole combined mixture passing into the heater C⁴. Here it heats the contained feed liquid, the vapors from evaporator B⁵ being condensed or partially condensed thereby, and then passes on into and through the evaporator B⁴ where the mixture again acts to heat and evaporate the liquid contained therein, passing out through the pipe 32ᵇ. The vapors produced in evaporator B⁴ issue through pipe 29ᵇ and commingle with the condensate or mixture coming through the pressure reducing valve 33ᵈ. In like manner the process is carried on in the other evaporators and heaters, the resulting condensate issuing in a single stream from pipe 38. The liquid evaporated from the various evaporators is automatically replaced from the corresponding or associated heater, excepting that the last two evaporators are supplied from the same —the last—heater. The heaters are constantly supplied by the constant pumping or forcing of the liquid to be distilled into the first heater A by way of the pipe 16. After starting the apparatus and establishing the forward flow of the feed and the return flow of the condensate, the heaters and evaporators rise in temperature until certain values are attained, after which during operation, all temperatures remain constant. I find that in handling water with seven evaporators, as shown in the drawings, very good results are obtained by supplying the liquid to be distilled at a temperature of 60° F. and pressure of 100 lbs. and supplying the last evaporator with steam at a pressure of 100 lbs. and temperature of 338° F. The temperatures and pressures of the contents of the different evaporators will then be approximately as follows:

7th evaporator, pressure 75 lbs., temp. 320° F.
6th      "         "      59 "    "  302°
5th      "         "      38 "    "  285°
4th      "         "      25 "    "  267°
3rd      "         "      14 "    "  248°
2nd      "         "       6 "    "  231°
1st      "         "       0 "    "  212°

When operating under these conditions, the distillate issues as a liquid stream, with practically no steam. With liquid other than water, for which the apparatus may be equally well adapted, the values would be different from those stated, depending upon the physical properties of the substances.

In order that the temperature of the feed delivered by each heater may be equal to that of the evaporator chamber supplied, the extent of transmitting surface in the several heaters would need to vary in size, increasing as the temperature to which they are subjected increases. As a practical matter, however, such a differentiation is not deemed essential to the proper working, and in the apparatus herein shown, all of the foregoing heaters are of the same size.

The arrangement of parts shown by the various diagrams is such as are suited to an apparatus working from an initial steam pressure of 100 pounds, and delivering the condensed liquid against atmospheric pressure. The cycle of the apparatus is, however, such as to permit an air pump being used upon the discharge end and in this connection the pressure against which the condensed liquid will be delivered may be reduced below the pressure of the atmosphere. By such means there may be secured a wider range of temperature than could otherwise be had, or an apparatus may be designed to work entirely below the pressure of the atmosphere, it being possible to have the source of heat in this case the exhaust steam from an engine.

In cases where low terminal pressures are used it may happen that the difference in the pressure of one evaporator chamber, as compared with that next adjoining it, may be less than the pressure equivalent to the column of water and steam in the pipes 31, 31ª, etc., and circulation would naturally cease. In view of this fact, an apparatus designed to work under a vacuum would have the evaporators of lower temperature, placed one above the other, the series being in part at least, arranged in a vertical line instead of a horizontal line. I do not therefore wish to be confined to the particular order in the arrangement of parts which is here described, but on the contrary, the description and the diagrams are to be given a general interpretation, the right being reserved to use any other arrangement adapted to the accomplishment of the general results herein set forth.

It will be understood that I do not wish to limit myself to the application of this feed system to apparatus embodying the invention of my said Patent No. 713,297, Nov. 11, 1892, as I consider it capable of various other uses. Nor do I wish to limit myself to the exact feed apparatus herein set forth, as I consider the same capable of modification and change without departing from the spirit of the invention.

What I claim as my invention is:

1. The combination with a series of evaporators, of a series of heaters, one for each evaporator, a feed pipe system running between the heaters from one to another in succession, connections for feeding the liquid from each heater to the evaporator with which it is associated, and a pump for supplying liquid to said piping system.

2. The combination with a series of evaporators, of a series of heaters, one for each evaporator, a piping system running between the heaters from one to another, connections for feeding the liquid from each heater to the evaporator with which it is associated, and a pump for circulating the liquid through the same, the pressure in said heaters being maintained at the highest pressure in the evaporators.

3. The combination with a series of evaporators, of means for inducing a circulation of the liquid to be heated through the evaporators in a forwardly direction, and for inducing a circulation of the condensate through the evaporators in a backwardly direction, a series of heaters one for each evaporator, pipes extending from each heater to the evaporator with which it is associated, a piping system extending between the heaters from one to another, and means for circulating liquid through the heaters.

4. The combination of a set or series of evaporators under different temperatures, means whereby the vapors and condensates from the various evaporators heat and evaporate liquid in the other evaporators, a series of heaters one for each evaporator, connections between the heaters and the evaporators with which they are respectively associated, and means whereby the evaporators and condensates heat the liquid in the heaters to substantially the temperatures of the evaporators before it enters the latter.

5. The combination of a set or series of evaporators, means for heating the endmost evaporator, means whereby the products of evaporation of said evaporators are caused to act in evaporating the liquid in the preceding evaporators, means for inducing a return flow of the condensate, a set or series of heaters, one for each evaporator, connections between the heaters and the evaporators with which they are respectively associated, means for supplying said heaters with liquid at a pressure at least as great as the highest evaporator pressure, and means whereby the products of evaporation heat the liquid in the heaters to substantially the temperatures of the evaporators they are to supply.

6. A feed system for a series of evaporators, said feed system comprising a set or series of heaters, means for supplying all of said heaters one after another with liquid from the same source, means for heating the liquid in the same by the products of evaporation from the evaporators, and means for conveying the heated liquid from the heaters to the evaporators with which the heaters are respectively associated.

7. The combination of a series of evaporators, a series of heaters one for each evaporator, pipes 23 leading from the upper part of the several heaters to the lower part of the next preceding heater, pipes 24 extending up from the lower part of each evaporator to the pipe 23 leading from the heater of said evaporator to the next heater, pipe 29 leading from the top of the several heaters to the top of the next preceding evaporator, pipes 32 leading from the heater connections of the pipes 29 to the bottom of the next preceding evaporators, and pressure-reducing valves at the heater connections of the pipes 29 and 32.

8. In apparatus of the class described, an evaporator comprising a cylindric casing provided at its upper end with a transverse plate 7, a series of tubes 6, 6 supported by said plate 7 and extending downwardly therefrom but having their upper ends opening above said plate, a plate 8 secured to the lower end of said tubes 6 and carrying a bowl 13, the plate 8 and bowl 13 being of less diameter than the casing 1 so as to form a passageway for the liquid between the same and the casing, and an outlet pipe 14 extending from the bowl 13 down to the bottom of the casing and forming an outlet for the condensate precipitated in the pipes 6, 6.

9. An evaporator comprising a cylindric casing closed at its upper and lower ends, a series of tubes or pipes 6, 6 extended lengthwise through said casing and supported therein, a partition 7 below the upper open ends of said tube 6, forming a chamber at the upper end of the tube or casing separated or closed from the lower portion of said casing, a receptacle at the lower end of said tubes 6 closed from the interior of the casing, and an outlet from said receptacle extending to the outside of said casing.

In witness whereof, I hereunto subscribe my name this 29th day of August, A. D. 1902.

WILLIAM F. M. GOSS.

Witnesses:
A. MILLER BELFIELD,
ISABEL C. LEE.